(12) United States Patent
Shang et al.

(10) Patent No.: US 11,385,818 B2
(45) Date of Patent: Jul. 12, 2022

(54) METHOD, ELECTRONIC DEVICE AND COMPUTER PROGRAM PRODUCT FOR MANAGING DISKS

(71) Applicant: EMC IP Holding Company LLC, Hopkinton, MA (US)

(72) Inventors: Rongrong Shang, Beijing (CN); Geng Han, Beijing (CN); Jian Gao, Beijing (CN); Xiaobo Zhang, Beijing (CN); Jibing Dong, Beijing (CN); Hongpo Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 6 days.

(21) Appl. No.: 16/887,202

(22) Filed: May 29, 2020

(65) Prior Publication Data

US 2021/0132844 A1    May 6, 2021

(30) Foreign Application Priority Data

Oct. 31, 2019    (CN) .......................... 201911050325.X

(51) Int. Cl.
*G06F 3/06*    (2006.01)
(52) U.S. Cl.
CPC .......... *G06F 3/0644* (2013.01); *G06F 3/0604* (2013.01); *G06F 3/0674* (2013.01)
(58) Field of Classification Search
None
See application file for complete search history.

(56) References Cited

U.S. PATENT DOCUMENTS

| | | | |
|---|---|---|---|
| 10,146,651 B2 | 12/2018 | Joshi et al. |
| 10,606,657 B2 | 3/2020 | Yadhav et al. |
| 10,678,643 B1 | 6/2020 | Gao et al. |
| 10,761,940 B2 | 9/2020 | Wang et al. |
| 10,782,922 B2 | 9/2020 | Gibes et al. |
| 10,860,476 B2 | 12/2020 | Xu et al. |
| 10,936,419 B2 | 3/2021 | Xu et al. |
| 11,003,556 B2 | 5/2021 | Ma et al. |

(Continued)

FOREIGN PATENT DOCUMENTS

| | | |
|---|---|---|
| CN | 108733307 | 11/2018 |
| CN | 109840051 | 8/2020 |

(Continued)

*Primary Examiner* — Stephanie Wu
(74) *Attorney, Agent, or Firm* — BainwoodHuang

(57) ABSTRACT

Techniques for managing disks involve: in response to a number of a plurality of disks to be partitioned being greater than a predetermined number of disks in a disk set, determining a plurality of candidate combinations of disk sets from the plurality of disks. The techniques further involve selecting a target combination from the plurality of candidate combinations, a first disk set of the target combination comprising at least a first subset corresponding to a first disk array, a second disk set of the target combination comprising at least a second subset corresponding to a second disk array, a number of disks in the first subset and a number of disks in the second subset being both equal to a first number and the disks in the first subset being different from the disks in the second subset. Accordingly, such techniques improve the storage efficiency of the disk array.

17 Claims, 5 Drawing Sheets

(56) References Cited

U.S. PATENT DOCUMENTS

| | | | |
|---|---|---|---|
| 11,048,416 B2 | 6/2021 | Liu et al. | |
| 11,150,823 B2 | 10/2021 | Gao et al. | |
| 11,163,464 B1 | 11/2021 | Gao et al. | |
| 2003/0074527 A1* | 4/2003 | Burton | G06F 3/0601 |
| | | | 711/114 |
| 2007/0118689 A1* | 5/2007 | Hyde, II | G06F 3/0607 |
| | | | 711/114 |
| 2008/0140930 A1* | 6/2008 | Hotchkiss | G06F 3/0631 |
| | | | 711/114 |
| 2013/0132672 A1* | 5/2013 | Kimura | G06F 3/0611 |
| | | | 711/114 |
| 2014/0365819 A1 | 12/2014 | Cooper et al. | |
| 2015/0012702 A1* | 1/2015 | Wang | G06F 3/0632 |
| | | | 711/114 |
| 2017/0168714 A1* | 6/2017 | Saha | G06F 3/0653 |
| 2020/0133848 A1 | 4/2020 | Xu et al. | |
| 2020/0133852 A1 | 4/2020 | Lv et al. | |
| 2020/0341846 A1 | 10/2020 | Dong et al. | |
| 2020/0348858 A1 | 11/2020 | Kang et al. | |
| 2021/0117296 A1 | 4/2021 | Lv et al. | |
| 2021/0124520 A1 | 4/2021 | Tang et al. | |
| 2021/0216231 A1 | 7/2021 | Yang et al. | |
| 2021/0286676 A1 | 9/2021 | Zhuo et al. | |
| 2021/0342079 A1 | 11/2021 | Gao et al. | |

FOREIGN PATENT DOCUMENTS

| | | |
|---|---|---|
| CN | 112748862 | 5/2021 |
| CN | 113126890 | 7/2021 |

\* cited by examiner

METHOD, ELECTRONIC DEVICE AND COMPUTER PROGRAM PRODUCT FOR MANAGING DISKS

CROSS-REFERENCE TO RELATED APPLICATION

This application claims priority to Chinese Patent Application No. CN201911050325.X, on file at the China National Intellectual Property Administration (CNIPA), having a filing date of Oct. 31, 2019, and having "METHOD, ELECTRONIC DEVICE AND COMPUTER PROGRAM PRODUCT FOR MANAGING DISKS" as a title, the contents and teachings of which are herein incorporated by reference in their entirety.

FIELD

Embodiments of the present disclosure relate to the field of data storage, and more specifically to a method, electronic device and computer program product for managing disks.

BACKGROUND

A disk array is a group of disks formed by combining a plurality of independent disks in different ways. The disk array may be for example a redundant array of independent disks (RAID), or a group of disks having other suitable structures/forms. For users, a disk array is like a disk, but it may provide higher storage capability than a single hard disk, and it may also provide data backup. Different manners of forming disk arrays are referred to as RAID levels, such as RAID0, RAID1, RAID5, and so on. It should be understood that the number of disks needs to be limited, which means that disk slices need to be allocated among a limited number of disks. A set of the limited number of disks is usually referred to as a RAID Resiliency Set (RRS for short). In consideration of the reliability, the number of disks in each RRS has an upper limit. When the number of disks in the RRS changes, for example, if the number of disks in the RRS exceeds the upper limit, a new RRS needs to be created. How to choose an optimal RRS combination is a problem that is in urgent need of a solution.

SUMMARY

Embodiments of the present disclosure provide a method, electronic device and computer program product for managing disks.

According to a first aspect of the present disclosure, there is provided a method of managing disks. The method includes: in response to a number of a plurality of disks to be partitioned being greater than a predetermined number of disks in a disk set, determining a plurality of candidate combinations of disk sets from the plurality of disks. In addition, the method further includes selecting a target combination from the plurality of candidate combinations, a first disk set of the target combination including at least a first subset corresponding to a first disk array, a second disk set of the target combination including at least a second subset corresponding to a second disk array, a number of disks in the first subset and a number of disks in the second subset being both equal to a first number and the disks in the first subset being different from the disks in the second subset.

According to a second aspect of the present disclosure, there is provided an electronic device for managing disks. The electronic device includes: a processor; and a memory storing computer program instructions, the processor executing the computer program instructions in the memory to control the electronic device to perform acts, the acts including: in response to a number of a plurality of disks to be partitioned being greater than a predetermined number of disks in a disk set, determining a plurality of candidate combinations of disk sets from the plurality of disks; and selecting a target combination from the plurality of candidate combinations, a first disk set of the target combination including at least a first subset corresponding to a first disk array, a second disk set of the target combination including at least a second subset corresponding to a second disk array, a number of disks in the first subset and a number of disks in the second subset being both equal to a first number and the disks in the first subset being different from the disks in the second subset.

According to a third aspect of the present disclosure, there is provided a computer program product tangibly stored on a non-transitory computer-readable medium and including machine-executable instructions, the machine-executable instructions, when executed, causing a machine to perform steps of the method in the first aspect of the disclosure.

BRIEF DESCRIPTION OF THE DRAWINGS

Through the following detailed description of example embodiments with reference to the accompanying drawings, the above and other objectives, features, and advantages of the present disclosure will become more apparent. In example embodiments of the present disclosure, the same reference symbols usually refer to the same components.

In the figures, the same or corresponding reference numerals represent the same or corresponding parts.

DETAILED DESCRIPTION OF EMBODIMENTS

Figure 1:
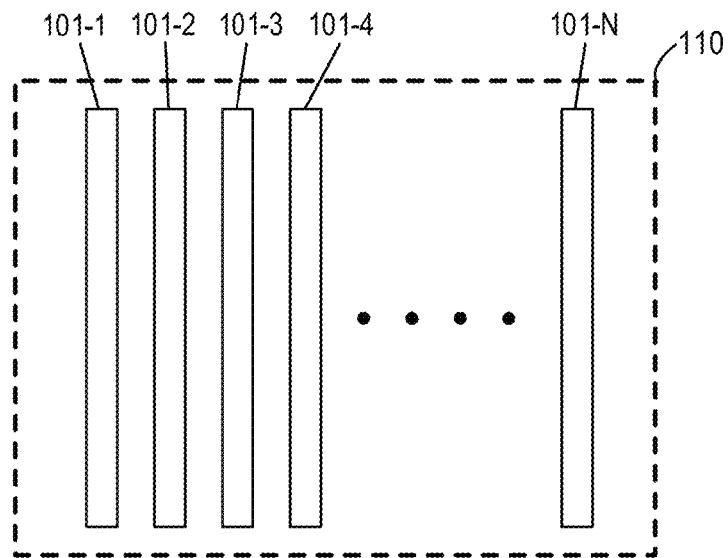
FIG. 1 illustrates a schematic diagram of a disk set according to an embodiment of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, embodiments of the present disclosure will be described in more detail with reference to the figures. Although the figures show certain embodiments of the present disclosure, it should be appreciated that the present disclosure may be implemented in various forms and should not be construed as being limited to the embodiments illustrated herein, and instead these embodiments are provided to enable more thorough and complete understanding of the present disclosure. It should be appreciated that the figures and embodiments of the present disclosure are only by way of example, and are not intended to limit the protection scope of the present disclosure.

In the depictions of the embodiments of the present disclosure, the term "includes" and its variants are to be read as open-ended inclusion, that is "includes, but is not limited to." The term "based on" is to be read as "based at least in part on." The term "one embodiment" and "the embodiment" are to be read as "at least one embodiment." Terms "a first", "a second" and others may denote different or identical objects. Other explicit or implicit definitions may also be included below.

The principles of the present disclosure will be described below with reference to several example embodiments shown in the figures. Although preferred embodiments of the present disclosure are shown in the figures, it should be understood that these embodiments are described only to enable those skilled in the art to better understand and then implement the present disclosure, and not to limit the scope of the present disclosure in any way.

For some users, upon initially building a disk array, users usually choose a smaller number of disks when configuring the disk array. However, as the number of subsequent disks increases, if the number of disks exceeds a predetermined upper limit disk number of the disk set RRS, a plurality of managed disks need to be grouped. That is, a new disk set needs to be created for the redundant disks, and an optimal combination of a plurality of disk sets needs to be determined. Therefore, how to choose the optimal RRS combination is a problem that needs to be solved urgently.

Furthermore, for various reasons, some disks are removed from the disk set. If the number of disks after the removal operation is less than or equal to the predetermined upper limit disk number of the disk set, the disks in the plurality of disk sets may be organized and merged into a smaller number of disk sets. In addition, when the system is started, an optimized configuration of the disk set is optionally involved. Therefore, for the above reasons, it is necessary to determine an optimal combination of RRS combinations or one combination among a plurality of better combinations.

In order to solve the above problems, the present disclosure proposes a solution for managing disks. In the solution, the utilization rate of all disks partitioned into a plurality of disk sets may be improved by setting a minimum number of disks in each disk set. In addition, after determining a plurality of candidate combinations that meet the minimum number of disks in each disk set, it is possible to select an optimal combination from these combinations by calculating a maximum available capacity, thereby further improving the utilization of all disks, while significantly reducing the computing resources for selecting the combination manners of the disk sets. The basic concept of the present disclosure will first be discussed below in connection with FIG. 1.

FIG. 1 illustrates a schematic diagram of a disk set 110 according to an embodiment of the present disclosure. As shown in FIG. 1, the disk set 110 may include a plurality of disks 101-1, 101-2, 101-3, 101-4, . . . 101-N (hereinafter collectively referred to as "disk 101"), where N is an integer greater than 1 and may represent the number of disks in the disk set 110. As an example, the disk set 110 may be a RAID Resiliency Set RRS, which has a preset upper limit disk number. If the number of disks N in the disk set 110 is greater than the preset upper limit disk number, an additional disk set needs to be created and all the disks in the disk set 110 are partitioned into all the disk sets.

The above examples are only used to illustrate the present disclosure, but not to limit the present disclosure. The case of partitioning all the disks in the disk set into two disk sets is described below in detail in connection with FIG. 2.

Figure 2:
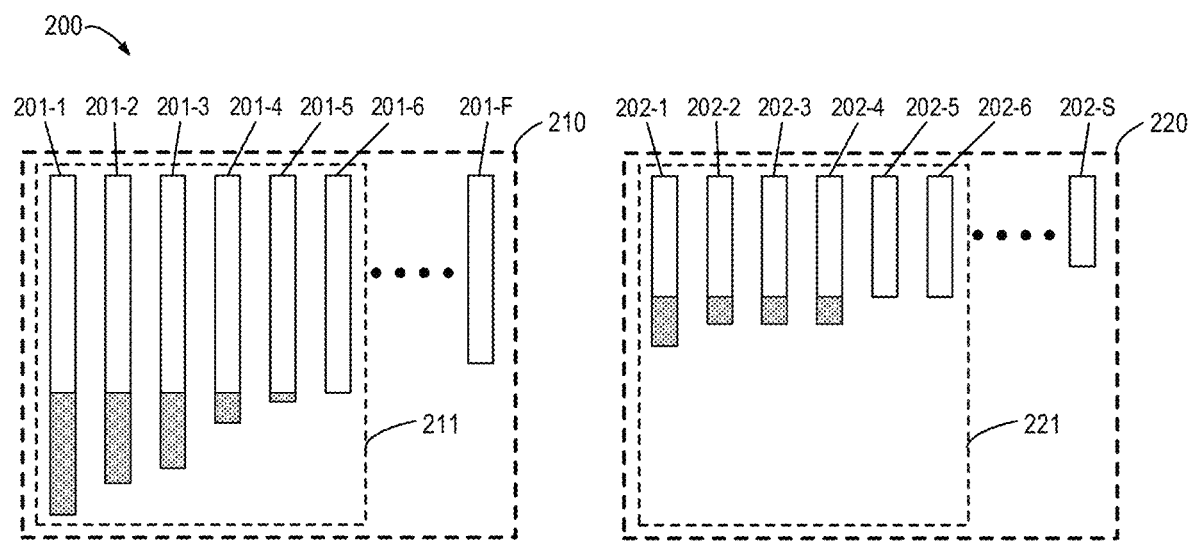
FIG. 2 illustrates a schematic diagram of a candidate combination containing a first disk set and a second disk set according to an embodiment of the present disclosure.

FIG. 2 illustrates a schematic diagram of a candidate combination 200 containing a first disk set 210 and a second disk set 220 according to an embodiment of the present disclosure. In FIG. 2, a portion of disks 201-1, 201-2, 201-3, 201-4, 201-5, 201-6, . . . 201-F (hereinafter collectively referred to as "disk 201") in the plurality of disks discussed above are partitioned into the first disk set 210, where F is an integer greater than 1 and less than N, and another portion of disks 202-1, 202-2, 202-3, 202-4, 202-5, 202-6 . . . 202-S (hereinafter collectively referred to as "disk 202") in the plurality of disks discussed above are partitioned into the second disk set 220, where S is an integer greater than 1 and less than N. In addition, a sum of F and S is equal to N.

In order to ensure the IO performance of each partitioned disk set, it is necessary to ensure that each partitioned disk set includes a predetermined number of disks. These disks may be referred to as a subset of the disk array. In some embodiments, this subset may be referred to as a head of the disk array, while other disks in the disk array may be referred to as a body of the disk array. The predetermined number corresponds to a width of the disk array. For example, the width of the disk array is 4+1, which means that a stripe of the disk array includes five disk slices, where four disk slices are used to store data, and one disk slice is used to store check data. Therefore, when 64 GB data is stored, the size of the space for storing the check data is 16 GB. By such analogy, if the width of the disk array is 4+2, the size of the space for storing the check data is 32 GB when 64 GB data is stored.

As an example, the above-mentioned predetermined number is the disk array's width +1. For example, the disks in the same number as the width of the disk array in the subset are used to perform the storage operation for the disk array. In addition, in the disk set, in order to ensure that there is sufficient spare space, for example, to ensure that there is a spare disk for data reconstruction when a disk in the disk set is corrupted, a disk (i.e., "+1") may be additionally disposed on the basis of the width of the disk array so that user data may still be protected based on the RAID algorithm. Preferably, the spare disk may be a disk having the largest effective capacity in the disk set.

As an example, in a RAID 5 system with the width of the disk array being 5 (namely, 4 disk slices for storing data and one disk slice for storing check data), if the number of disks in the disk set obtained after partitioning is smaller than 6, the partitioning manner of the disk set is not a good option in terms of the IO performance.

As shown in FIG. 2, a plurality of disks 201-1 . . . 201-F and 202-1 . . . 202-S may be arranged in a descending order according to the size of the physical capacity. Starting from the disk 201-1 with the largest physical capacity, the first 6 consecutive disks 201-1 . . . 201-6 in these disks are determined as a subset 211 of the first disk set 210, and the subset 211 may also be referred to as the head of the first disk set 210. In addition, an important principle for partitioning these disks is that each disk set needs to have a subset or head. Therefore, the other 6 consecutive disks 202-1 . . . 202-6 among these disks are determined as a subset 221 of the second disk set 220, and the subset 221 may also be referred to as the head of the second disk set 220.

It should be understood that based on the above-mentioned main principle of the present disclosure, each partitioned disk set must have a subset or head to ensure the IO performance of the disk set. As an example, in a 4+1 RAID5 system, if there are 23 disks in the original disk set and the user further adds 3 disks (for example, the total number of disks exceeds the upper limit disk number 25), a combination of two disk sets having 20 disks and 6 disks has the same capacity as a combination of two disk sets having 23 disks and 3 disks. However, since only the disk set having three disks does not have a subset or head in the combination of two disk sets having 23 disks and 3 disks, the combination is not a good option in terms of the IO performance. While if the combination of two disk sets having 20 disks and 6 disks is selected, the IO performance may be ensured because there are more than 6 disks as the subset in both disk sets.

In addition, a subset of a disk set is very important for the disk set because it will affect the available capacity of the disk set. Available capacity (or referred to as "effective capacity") is capacity that respective disks in the subset of the disk set may use to provide the storage space for the disk array. When there is not a sufficient number of disks of the same type to meet the RAID width requirement, the available capacity of the disk may be smaller than the physical capacity of the disk.

As shown in FIG. 2, the six disks 201-1 . . . 201-6 of the subset 211 of the first disk set 210 are all of different types, and each has a different physical capacity. Therefore, in order to apply the RAID algorithm, the available capacities of the disks in the subset 211 are all equal to a minimum capacity in the subset 211. It may be seen from FIG. 2 that the capacity of the disk 201-6 is a minimum capacity of the subset 211, so a portion indicated by a "white box" in the disks 201-1 . . . 201-6 in the subset 211 is the available capacity of the subset 211, and a portion indicated by a "grey box" in the disks 201-1 . . . 201-6 in the subset 211 is the unavailable capacity of the subset 211.

Similar to the case of the first disk set 210, the disk 202-1, disks 202-2 . . . 202-4 and disks 202-5 and 202-6 in the subset 221 of the second disk set 220 belong to three different types of disks. Therefore, in order to apply the RAID algorithm, the available capacities of the disks in the subset 221 are all equal to the minimum capacity in the subset 221. It may be seen from FIG. 2 that the capacity of the disk 202-5 or 202-6 is the minimum capacity of the subset 221, so a portion indicated by a "white box" in the disks 202-1 . . . 202-6 in the subset 221 is the available capacity of the subset 221, and a portion indicated by a "grey box" in the disks 202-1 . . . 202-6 in the subset 221 is the unavailable capacity of the subset 221.

Therefore, another important principle for partitioning these disks is that the available capacity of a subset of each disk set should be as large as possible. In other words, in order to ensure maximization of the available capacity of the subset of each disk set, the unavailable capacity of the subset of each disk set needs to be made as small as possible. The utilization rate of the disks may be enhanced by finding a combination of disk sets with the smallest unavailable capacity.

In addition, as shown in FIG. 2, the two disk sets 210 and 220 after the partitioning may also have a limitation in distance. That is, a further important principle for partitioning these disks is that the distance between the subsets or heads of two adjacent disk sets should be greater than the width of the subsets or heads of the disk sets, and less than the upper limit disk number of the disk sets. As an example, the number of disks (i.e., the "body" as described above) in the first disk set 210 other than the subset 211 should be greater than the width of the disk array (for example, 6), and less than or equal to the upper limit disk number of the disk sets 210, 220. In this way, a situation where there is an overlap between the partitioned disk sets may be avoided.

The example disk set 110 and the partitioned first disk set 210 and second disk set 220 are described above with reference to FIG. 1 and FIG. 2. A flowchart of a process for managing disks will be described in detail below in connection with FIG. 3.

Figure 3:
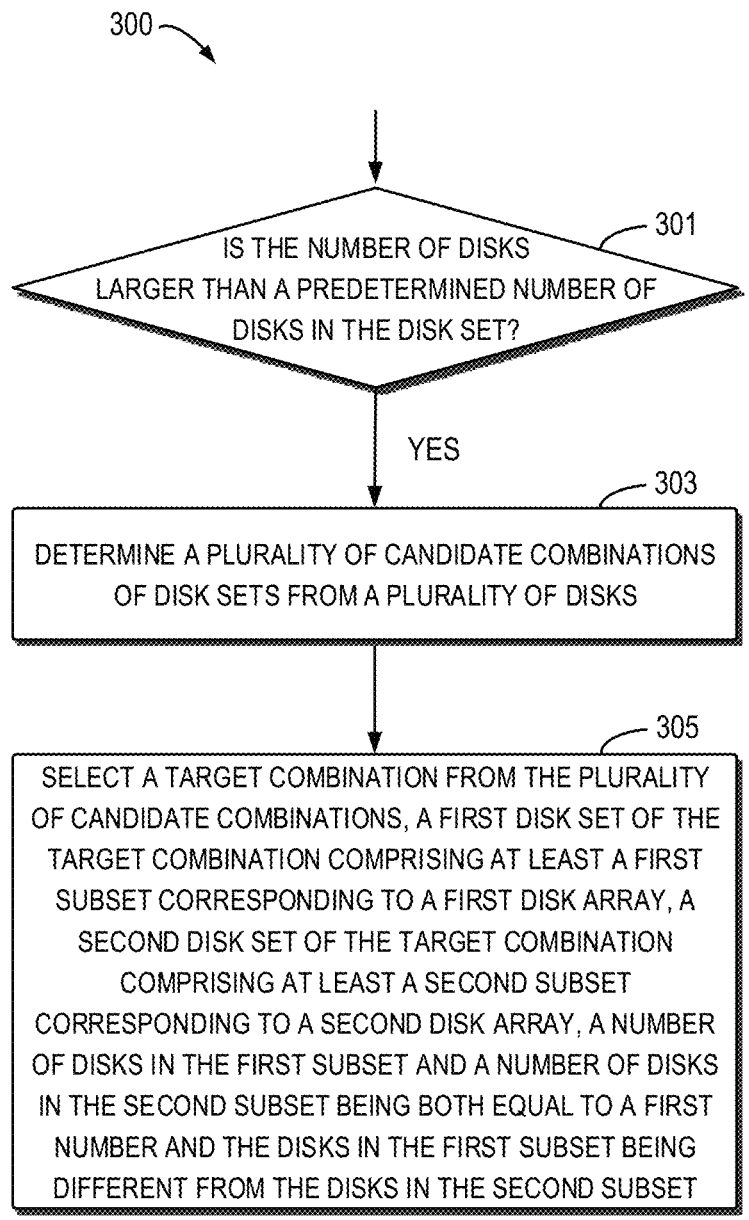
FIG. 3 illustrates a schematic diagram of a process for managing disks according to an embodiment of the present disclosure.

FIG. 3 illustrates a flowchart of a process or method 300 for managing disks according to an embodiment of the present disclosure. In some embodiments, the method 300 may be implemented in the device shown in FIG. 6. As an example, the method 300 may be implemented in the form of a candidate combination 200 shown in FIG. 2. A process or method 300 for managing disks according to an embodiment of the present disclosure will now be described with reference to FIG. 1 and FIG. 2. For ease of understanding, the specific data mentioned in the description below are all by way of example, and are not intended to limit the protection scope of the present disclosure.

At 301, a determination is made as to whether the number of a plurality of disks 101-1, 101-2, 101-3, 101-4, . . . 101-N to be partitioned is greater than a predetermined disk number of the disk set 110. As an example, the predetermined disk number of the disk set is a maximum number of disks that may be accommodated by the disk set. When the system is powered on, or when the user's operation of adding or removing a disk is detected, a total number of the current disks 101-1, 101-2, 101-3, 101-4 . . . 101-N may be obtained first. This total number is then compared with the maximum number of disks in the disk set. When the total number is greater than the maximum number of disks of the disk set, the process proceeds to 303.

At 303, a candidate combination 200 of the first disk set 210 and the second disk set 220 may be determined from a plurality of disks 101-1, 101-2, 101-3, 101-4 . . . 101-N. As an example, the first disk set 210 contains a portion of disks 201-1, 201-2, 201-3, 201-4, 201-5, 201-6 . . . 201-F in the plurality of disks discussed above, and the second disk set 220 contains another portion of disks 202-1, 202-2, 202-3, 202-4, 202-5, 202-6 . . . 202-S in the plurality of disks discussed above. It should be understood that since the number of disks is usually large, a plurality of candidate combinations 200 may be determined.

At 305, a target combination is selected from the plurality of candidate combinations 200 discussed above. In some embodiments, the first disk set 210 of the target combination at least includes a subset 211, and the subset 211 may contain a first number of disks corresponding to the first disk array. In addition, the second disk set 220 of the target combination at least includes a subset 221, and the subset 221 may contain the above first number of disks corresponding to the second disk array. Generally, the disks in the subset 211 are different from the disks in the subset 221. Here, the first number corresponding to the first disk array and the first number corresponding to the second disk array may both be the disk array's width +1, or other numbers related to the width of the disk array.

It is possible to, by implementing the above process, allow the operation of partitioning these disks to comply with the above-mentioned important principle, i.e., allow each disk set to have a subset (or head). As shown in FIG. 2, the first disk set 210 has a subset 211, and the second disk set 220 has a subset 221. In this way, the IO performance of the disk array may be guaranteed.

In order to satisfy more of the important principles described above, an alternative solution for selecting target combinations is proposed according to other embodiments of the present disclosure. This will be described in detail below in connection with FIG. 4.

Figure 4:
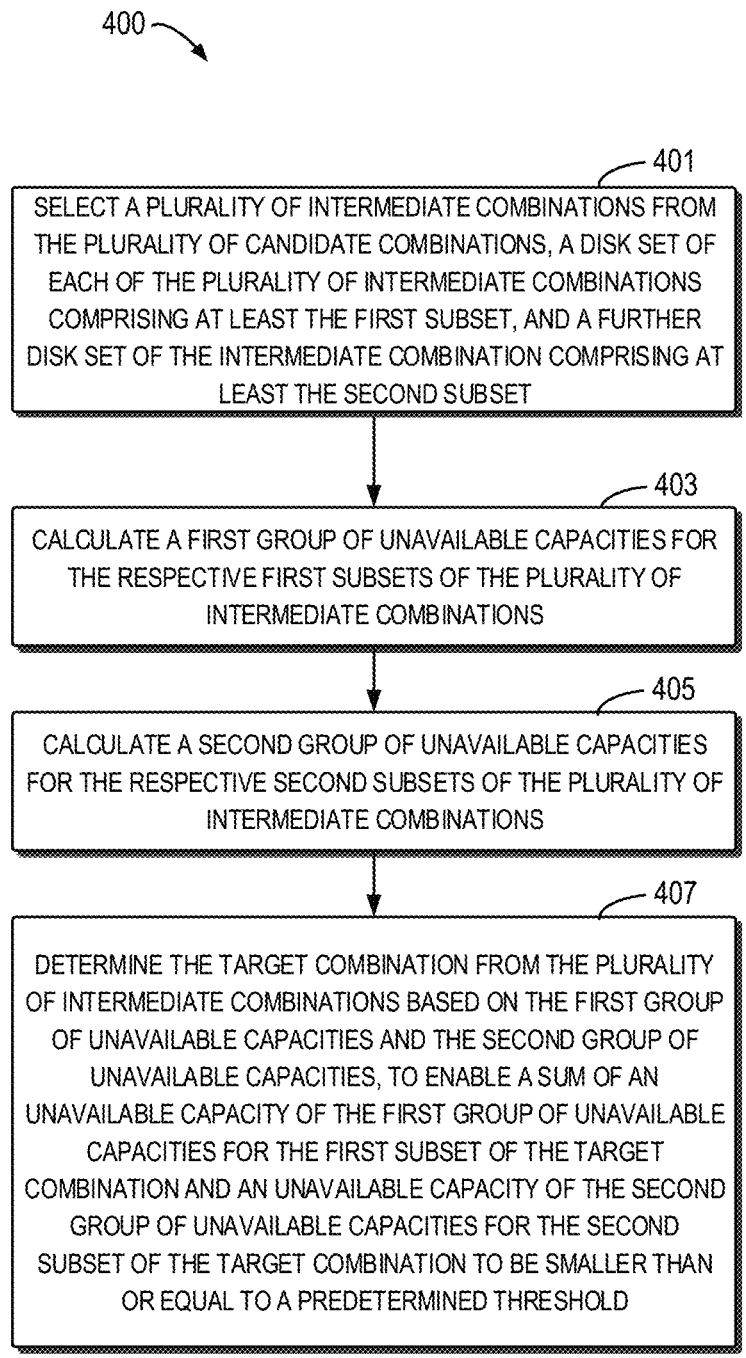
FIG. 4 illustrates a schematic diagram of a process for selecting a target combination according to an embodiment of the present disclosure.

FIG. 4 illustrates a flowchart of a process or method 400 for selecting a target combination according to an embodiment of the present disclosure. Specifically, FIG. 4 describes in detail a specific process of selecting a target combination in FIG. 3. In some embodiments, the method 400 may be implemented in the device shown in FIG. 6. As an example, the method 400 may be implemented in the form of the candidate combination 200 shown in FIG. 2. The process or method 400 for selecting a target combination according to an embodiment of the present disclosure will now be described with reference to FIG. 2. For ease of understanding, the specific data mentioned in the description below are all by way of example, and are not intended to limit the protection scope of the present disclosure.

At 401, a plurality of intermediate combinations may be selected from a plurality of candidate combinations 200. As shown in FIG. 2, the first disk set 210 of each intermediate combination at least includes a subset 211, and the second disk set 220 of each intermediate combination at least includes a subset 221.

Figure 5:
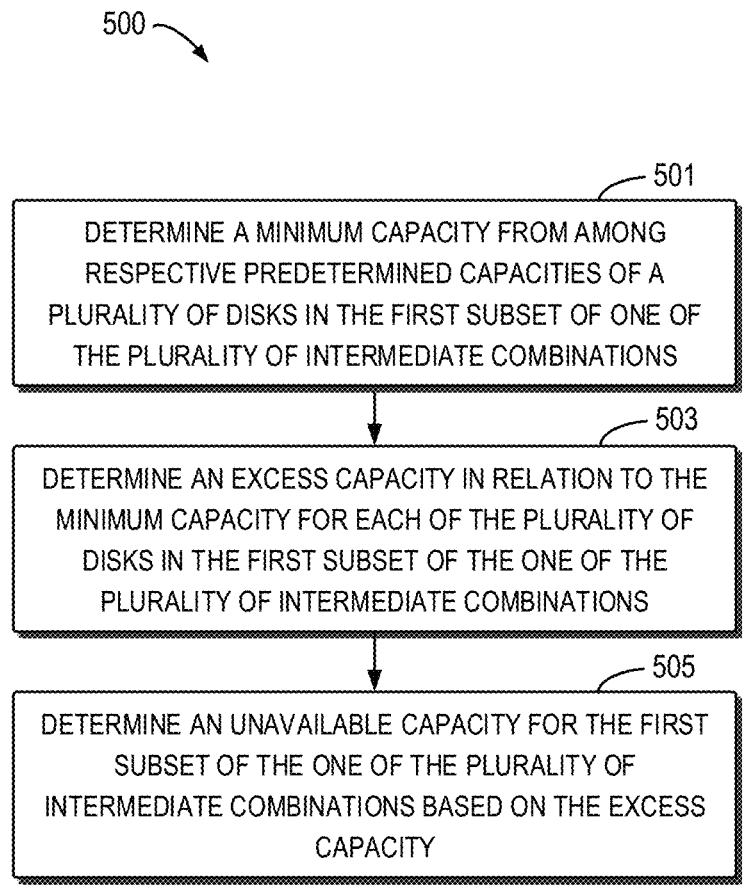
FIG. 5 illustrates a schematic diagram of a process for calculating unavailable capacity according to an embodiment of the present disclosure.

Returning to FIG. 4, at 403, a first group of unavailable capacities may be calculated for the respective subset 211 of the plurality of intermediate combinations discussed above. FIG. 5 illustrates a flowchart of a process or method 500 for calculating unavailable capacity according to an embodiment of the present disclosure. Specifically, FIG. 5 describes in detail a specific process for calculating unavailable capacity in FIG. 4. In some embodiments, the method 500 may be implemented in the device shown in FIG. 6. As an example, the method 500 may be implemented in the form of a candidate combination 200 shown in FIG. 2. The process or method 500 for calculating unavailable capacity according to an embodiment of the present disclosure will now be described with reference to FIG. 2. For ease of understanding, the specific data mentioned in the description below are all by way of example, and are not intended to limit the protection scope of the present disclosure.

At 501, a minimum capacity is determined from respective predetermined capacities of a plurality of disks in a subset 211 of an intermediate combination in the plurality of intermediate combinations discussed above. As shown in FIG. 2, the capacity of the disk 201-6 is the smallest capacity in the subset 211 of the first disk set 210 of the intermediate combination.

At 503, a determination is made as to an excess capacity of the plurality of disks of the subset 211 of the intermediate combination larger than the minimum capacity. As an example, the portion indicated by the "grey box" in the disks 201-1 . . . 201-6 in the subset 211 is the excess capacity beyond the minimum capacity.

At 505, the unavailable capacity of the subset 211 of the intermediate combination is determined based on the above excess capacity. As an example, the portion indicated by the "grey box" in the disks 201-1 . . . 201-6 in the subset 211 is the unavailable capacity of the subset 211. After the unavailable capacity of the subset 211 is determined, the process 400 proceeds to 405.

Returning to FIG. 4, at 405, a second group of unavailable capacities may be calculated for a respective subset 221 of the plurality of intermediate combinations. In some embodiments, similar to the process or method 500 of calculating the unavailable capacity of the subset 211, the minimum capacity may be determined from the respective predetermined capacities of the plurality of disks in the subset 221 of an intermediate combination of the plurality of intermediate combinations discussed above. As shown in FIG. 2, the capacity of the disk 202- or 202-6 is the minimum capacity in the subset 221 of the second disk set 220 of the intermediate combination. Thereafter, it is possible to determine the excess capacity of the plurality of disks of the subset 221 of the intermediate combination greater than the minimum capacity. As an example, the portion indicated by the "gray frame" in the disks 202-1 . . . 202-6 in the subset 221 is the excess capacity beyond the minimum capacity. Finally, the unavailable capacity of the subset 221 of the intermediate combination is determined based on the above excess capacity. As an example, the portion indicated by the "gray frame" in the disks 202-1 . . . 202-6 in the subset 221 is the unavailable capacity of the subset 221.

At 407, based on the first group of unavailable capacities and the second group of unavailable capacities discussed above, a target combination may be determined from a plurality of intermediate combinations, such that a sum of the unavailable capacity of the subset 211 of the target combination and the unavailable capacity of the subset 221 is less than or equal to a predetermined threshold. In some embodiments, a combination with the smallest sum of the unavailable capacity of the subset 211 and the unavailable capacity of the subset 221 may be directly selected as the target combination. Alternatively or additionally, it is possible to set a predetermined threshold, for example, a constant value, or the second smallest value among sums of a plurality of unavailable capacities of the plurality of combinations discussed above. If the sum of the unavailable capacity of the respective subset 211 and the unavailable capacity of the respective subset 221 of an intermediate combination is less than the predetermined threshold, the intermediate combination may be determined as the target combination. Furthermore, the plurality of disks discussed above may be partitioned based on the target combination.

It is possible to, by implementing the above process, enable the operation of partitioning these disks to comply with another important principle described above, that is, make the available capacity of the subset of each disk set as large as possible. As shown in FIG. 2, when the sum of the available capacities of the subset 211 of the first disk set 210 and the subset 221 of the second disk set 220 is the largest, or when the sum of the unavailable capacities of the subset 211 of the first disk set 210 and the subset 221 of the second disk set 220 is the smallest, the combination manner may be determined as the target combination. Furthermore, the plurality of disks discussed above may be partitioned based on the target combination. In this way, the utilization of the disk may be improved.

In some embodiments, the number of disks other than the subset 211 of the first disk set 210 of the above target combination may be greater than or equal to the first number, and less than or equal to a predetermined number of disks. In this way, the operation of partitioning these disks may be made to comply with the another important principle described above, that is, the distance between the subsets or heads of two adjacent disk sets should be greater than the width of the subsets or heads of the disk sets, and less than the upper limit disk number of the disk sets. As an example, the number of disks (i.e., the "body" as described above) in the first disk set 210 other than the subset 211 should be greater than the width of the disk array (for example, 6), and less than or equal to the upper limit disk number of the disk sets 210, 220. In this way, a situation where there is an overlap between the partitioned disk sets may be avoided.

In some embodiments, the number of disks included in the second disk set 220 of the target combination is equal to the first number discussed above. Here, the first number may be the disk array's width +1, or other numbers related to the width of the disk array. For example, in a 4+1 RAID5 system, if there are 23 disks in the original disk set and the user further adds 3 disks, a combination of two disk sets having 20 disks and 6 disks, respectively, has the same available capacity and the same IO performance as the combination of two disk sets having 13 disks and 13 disks, respectively. However, to reduce data movement, a combination of two disk sets having 20 disks and 6 disks would be an optimal choice. Certainly, if the number of disks in the first disk set 210 is equal to the upper limit disk number of the disk set, the number of disks included in the second disk set 220 may be greater than the first number.

In some embodiments, if it is detected the number of a plurality of disks 101-1, 101-2, 101-3, 101-4 . . . 101-N to be partitioned is less than or equal to the predetermined number of disks of the disk set 110 (for example, with respect to the situation where partial disks are removed), the plurality of disks 101-1, 101-2, 101-3, 101-4 . . . 101-N may be directly determined as the disks in the first disk set 210.

In some embodiments, if it is detected that the number of a plurality of disks 101-1, 101-2, 101-3, 101-4 . . . 101-N to be partitioned is greater than a predetermined multiple of the predetermined number of disks (for example, with respect to the situation where a lot of disks are added), the plurality of disks are partitioned into a predetermined multiple +1 disk sets. For example, when the number of these disks is larger than twice the predetermined number of disks, these disks may be partitioned into three disk sets. Certainly, each disk set and the relationship between disk sets should satisfy at least one of the above-mentioned important principles.

It should be understood that the plurality of disks 101-1, 101-2, 101-3, 101-4 . . . 101-N having the same capacity shown in FIG. 1 and disks 201-1, 201-2, 201-3, 201-4, 201-5, 201-6 . . . 201-F and 202-1, 202-2, 202-3, 202-4, 202-5, 202-6 . . . 202-S arranged in a descending order of the size of physical capacities shown in FIG. 2 are all by way of example. In particular, for the disks arranged in descending order of physical capacities in FIG. 2, the reason for arranging in the descending order is that this may make the subset or head of the selected disk set have a maximum available capacity. Certainly, it is not requisite to arrange these disks in descending order of physical capacities if thought is not given to the realization of the maximum available capacity. For example, it is also possible to select a plurality of disks with a physical capacity greater than a predetermined threshold to form a subset or head of the disk set. In this way, it is possible to select a plurality of partitioning combinations of disk sets having a larger available capacity. Of course, a plurality of disks may also be selected randomly or arbitrarily as a subset or head of the disk set. In this way, the available capacity of the subset depends on the disk with the smallest capacity among the plurality of disks selected. Although this manner might cause a large waste of capacity, the computing resources may be saved significantly.

Figure 6:
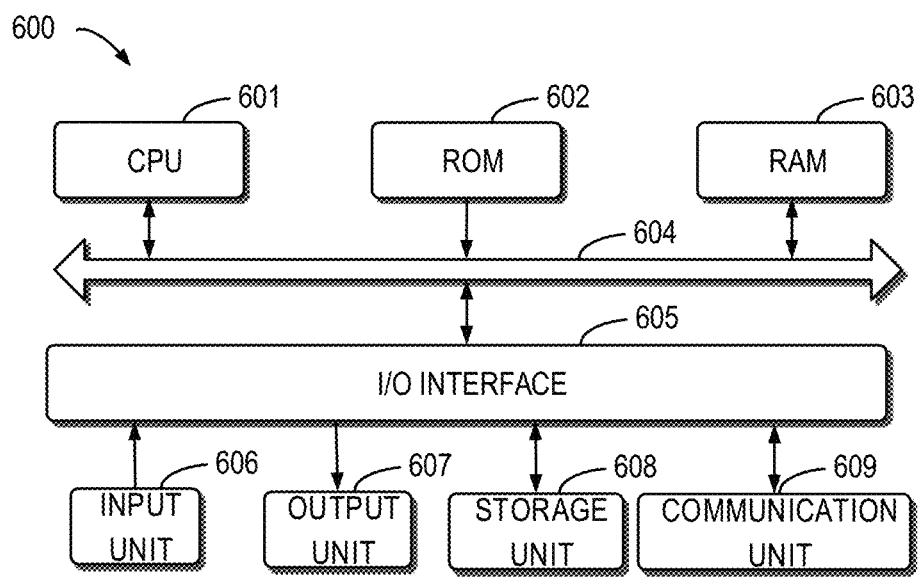
FIG. 6 illustrates a schematic block diagram of an example device which is adapted to implement embodiments of the present disclosure.

FIG. 6 illustrates a schematic block diagram of an example device 600 that may be used to implement embodiments of the present disclosure. As shown in the figure, the device 600 includes a central processing unit (CPU) 601 which may perform various appropriate actions and processing according to the computer program instructions stored in a read-only memory (ROM) 602 or the computer program instructions loaded from a storage unit 608 into a random access memory (RAM) 603. The RAM 603 may also store all kinds of programs and data required by operating the storage device 600. CPU 601, ROM 602 and RAM 603 are connected to each other via a bus 604. An input/output (I/O) interface 605 is also connected to the bus 604.

A plurality of components in the device 600 are connected to the I/O interface 605, including: an input unit 606, such as keyboard, mouse and the like; an output unit 607, such as various types of display, loudspeakers and the like; a storage unit 608, such as magnetic disk, optical disk and the like; and a communication unit 609, such as network card, modem, wireless communication transceiver and the like. The communication unit 609 allows the device 600 to exchange information/data with other devices through computer networks such as Internet and/or various telecommunication networks.

Each procedure and processing described above, such as methods 400, 500 and/or 600, may be executed by a processing unit 601. For example, in some embodiments, the methods 400, 500 and/or 600 may be implemented as computer software programs, which are tangibly included in a machine-readable medium, such as storage unit 608. In some embodiments, part or all of the computer programs may be loaded and/or installed onto the device 600 via ROM 602 and/or the communication unit 609. When the computer program is loaded to RAM 603 and executed by CPU 601, one or more acts of the above described methods 400, 500 and/or 600 may be performed.

The present disclosure may be a method, an apparatus, a system and/or a computer program product. The computer program product can include a computer-readable storage medium loaded with computer-readable program instructions thereon for executing various aspects of the present disclosure.

The computer-readable storage medium may be a tangible device capable of holding and storing instructions used by an instruction execution device. The computer-readable storage medium may be, but is not limited to, for example, electrical storage devices, magnetic storage devices, optical storage devices, electromagnetic storage devices, semiconductor storage devices, or any random appropriate combination thereof. More specific examples (non-exhaustive list) of the computer-readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as a punched card storing instructions or an emboss within a groove, and any random suitable combination thereof. A computer-readable storage medium used herein is not interpreted as a transitory signals per se, such as radio waves or other freely propagated electromagnetic waves, electromagnetic waves propagated through a waveguide or other transmission medium (e.g., optical pulses passing through fiber-optic cables), or electrical signals transmitted through electric wires.

The computer-readable program instructions described herein may be downloaded from a computer-readable storage medium to various computing/processing devices, or to external computers or external storage devices via a network, for example, the Internet, a local area network, a wide area network and/or a wireless network. The network may include copper transmission cables, optical fiber transmission, wireless transmission, routers, firewalls, switches, gateway computers and/or edge servers. The network adapter card or network interface in each computing/processing device receives computer-readable program instructions from the network and forwards the computer-readable program instructions for storage in a computer-readable storage medium of each computing/processing device.

Computer-readable program instructions for executing the operations of the present disclosure may be assembly instructions, instructions of instruction set architecture (ISA), machine instructions, machine dependent instructions, microcode, firmware instructions, state setting data, or either source code or object code written by any combination of one or more programming languages including object oriented programming languages, such as Smalltalk, C++ or the like, and conventional procedural programming languages, such as the "C" programming language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described in reference with the flow chart and/or block diagrams of method, apparatus (systems), and computer program product according to embodiments of the present disclosure. It will be understood that each block in the flow chart and/or block diagrams, and combinations of various blocks thereof may be implemented by computer-readable program instructions.

The computer-readable program instructions may be provided to the processing unit of a general purpose computer, a dedicated computer or other programmable data processing devices to generate a machine, causing the instructions, when executed by the processing unit of the computer or other programmable data processing apparatuses, to generate an apparatus for implementing the functions/actions specified in one or more blocks of the flow chart and/or block diagram. The computer-readable program instructions may also be stored in the computer-readable storage medium. These instructions enable the computer, the programmable data processing apparatus and/or other devices to operate in a particular way, such that the computer-readable medium storing instructions may include a manufactured article that includes instructions for implementing various aspects of the functions/actions specified in one or more blocks of the flow chart and/or block diagram.

The computer-readable program instructions may also be loaded into computers, other programmable data processing apparatuses, or other devices, so as to execute a series of operational steps on the computers, other programmable data processing apparatuses or other devices to generate a computer-implemented process. Therefore, the instructions executed on the computer, other programmable data processing apparatus, or other device may realize the functions/actions specified in one or more blocks of the flow chart and/or block diagram.

The accompanying flow chart and block diagram present possible architecture, functions and operations of the possible implementations of the system, method and computer program product according to a plurality of embodiments of the present disclosure. At this point, each block in the flow chart or block diagram may represent a module, a program segment, or a portion of the instruction. The module, the program segment or the portion of the instruction includes one or more executable instructions for implementing specified logic functions. In some alternative implementations, the function marked in the block may also occur in an order different from the one marked in the drawings. For example, two consecutive blocks actually may be executed basically in parallel, and sometimes they may also be executed in a reverse order depending on the involved functions. It should also be noted that each block in the block diagram and/or flow chart, and combinations of the blocks thereof may be implemented by a dedicated hardware-based system for performing specified functions or actions, or a combination of the dedicated hardware and the computer instructions.

Various embodiments of the present disclosure have been described above, and the above illustration is by way of example rather than exhaustive and is not limited to the disclosed embodiments. Without departing from the scope and spirit of each illustrated embodiment, many alterations and modifications are obvious for those ordinary skilled in the art. The selection of terms in the text aims to best explain principle, actual application or technical improvement to the commercially available technologies of various embodiments or make the various embodiments disclosed herein comprehensible for those ordinary skilled in the art.

We claim:

1. A method of managing disks, comprising:
   in response to a number of a plurality of disks to be partitioned into disk sets being greater than a predetermined maximum number of disks per disk set, determining a plurality of candidate combinations of disks into disk sets; and
   selecting a target combination from the plurality of candidate combinations, a first disk set of the target combination comprising at least a first subset of the first disk set corresponding to a first disk array, a second disk set of the target combination comprising at least a second subset of the second disk set corresponding to a second disk array, a number of disks in the first subset and a number of disks in the second subset being both equal to a first number and the disks in the first subset being different from the disks in the second subset, wherein selecting the target combination from the plurality of candidate combinations comprises:

selecting a plurality of intermediate combinations from the plurality of candidate combinations, a disk set of each of the plurality of intermediate combinations comprising at least a first subset for that intermediate combination, and a further disk set of the intermediate combination comprising at least a second subset for that intermediate combination;

calculating a first group of unavailable capacities for the respective first subsets for the plurality of intermediate combinations; and calculating a second group of unavailable capacities for the respective second subsets for the plurality of intermediate combinations.

2. The method according to claim 1, wherein selecting the target combination from the plurality of candidate combinations further comprises:

determining the target combination from the plurality of intermediate combinations based on the first group of unavailable capacities and the second group of unavailable capacities to enable a sum of an unavailable capacity of the first group of unavailable capacities for the first subset for that target combination and an unavailable capacity of the second group of unavailable capacities for the second subset for that target combination to be smaller than or equal to a predetermined threshold.

3. The method according to claim 2, wherein calculating the first group of unavailable capacities comprises:

determining a minimum capacity from among respective predetermined capacities of a plurality of disks in the first subset for one of the plurality of intermediate combinations; and determining an excess capacity in relation to the minimum capacity for each of the plurality of disks in the first subset for the one of the plurality of intermediate combinations;

determining an unavailable capacity for the first subset for the one of the plurality of intermediate combinations based on the excess capacity.

4. The method according to claim 1, wherein a number of disks other than the first subset in the first disk set of the target combination is greater than or equal to the first number and smaller than or equal to the predetermined maximum number of disks.

5. The method according to claim 1, wherein a number of disks contained in the second disk set for the target combination is equal to the first number.

6. The method according to claim 1, further comprising:

in response to the number of the plurality of disks being smaller than or equal to the predetermined maximum number of disks, determining the plurality of disks as disks in the first disk set.

7. An electronic device, comprising:
a processor; and
a memory storing computer program instructions, the processor executing the computer program instructions in the memory to control the electronic device to perform acts, the acts comprising:

in response to a number of a plurality of disks to be partitioned into disk sets being greater than a predetermined maximum number of disks per disk set, determining a plurality of candidate combinations of disks into disk sets; and selecting a target combination from the plurality of candidate combinations, the target combination including a first disk set of the disk sets and a second disk set of the disk sets, the first disk set of the target combination comprising at least a first subset of disks corresponding to a first disk array, the second disk set of the target combination comprising at least a second subset of disks corresponding to a second disk array, a number of disks in the first subset and a number of disks in the second subset being both equal to a first number and the disks in the first subset being different from the disks in the second subset, wherein a number of disks other than the first subset in the first disk set of the target combination is greater than or equal to the first number, and smaller than predetermined maximum number of disks.

8. The electronic device according to claim 7, wherein selecting the target combination from the plurality of candidate combinations comprises:

selecting a plurality of intermediate combinations from the plurality of candidate combinations, a disk set of each of the plurality of intermediate combinations comprising at least a first subset for that intermediate combination, and a further disk set of the intermediate combination comprising at least a second subset for that intermediate combination;

calculating a first group of unavailable capacities for the respective first subsets for the plurality of intermediate combinations;

calculating a second group of unavailable capacities for the respective second subsets for the plurality of intermediate combinations; and determining the target combination from the plurality of intermediate combinations based on the first group of unavailable capacities and the second group of unavailable capacities to enable a sum of an unavailable capacity of the first group of unavailable capacities for the first subset for that target combination and an unavailable capacity of the second group of unavailable capacities for the second subset for that target combination to be smaller than or equal to a predetermined threshold.

9. The electronic device according to claim 8, wherein calculating the first group of unavailable capacities comprises:

determining a minimum capacity from among respective predetermined capacities of a plurality of disks in the first subset for one of the plurality of intermediate combinations; and determining an excess capacity in relation to the minimum capacity for each of the plurality of disks in the first subset for the one of the plurality of intermediate combinations;

determining an unavailable capacity for the first subset for the one of the plurality of intermediate combinations based on the excess capacity.

10. The electronic device according to claim 7, wherein a number of disks contained in the second disk set for the target combination is equal to the first number.

11. The electronic device according to claim 7, wherein the acts further comprise:

in response to the number of the plurality of disks being smaller than or equal to the predetermined maximum number of disks, determining the plurality of disks as disks in the first disk set.

12. A computer program product having a non-transitory computer readable medium which stores a set of instructions to manage disks; the set of instructions, when carried out by computerized circuitry, causing the computerized circuitry to perform a method of:

in response to a number of a plurality of disks to be partitioned into disk sets being greater than a predetermined maximum number of disks per disk set, determining a plurality of candidate combinations of disks into disk sets; and selecting a target combination from the plurality of candidate combinations, a first disk set of the target combination comprising at least a first subset of the first disk set corresponding to a first disk array, a second disk set of the target combination comprising at least a second subset of the second disk set corresponding to a second disk array, a number of disks in the first subset and a number of disks in the second subset being both equal to a first number and the disks in the first subset being different from the disks in the second subset, wherein selecting the target combination from the plurality of candidate combinations comprises:

selecting a plurality of intermediate combinations from the plurality of candidate combinations, a disk set of each of the plurality of intermediate combinations comprising at least a first subset for that intermediate combination, and a further disk set of the intermediate combination comprising at least a second subset for that intermediate combination;

calculating a first group of unavailable capacities for the respective first subsets for the plurality of intermediate combinations; and calculating a second group of unavailable capacities for the respective second subsets for the plurality of intermediate combinations.

13. The computer program product according to claim 12, wherein selecting the target combination from the plurality of candidate combinations further comprises:

determining the target combination from the plurality of intermediate combinations based on the first group of unavailable capacities and the second group of unavailable capacities to enable a sum of an unavailable capacity of the first group of unavailable capacities for the first subset for that target combination and an unavailable capacity of the second group of unavailable capacities for the second subset for that target combination to be smaller than or equal to a predetermined threshold.

14. The computer program product according to claim 13, wherein calculating the first group of unavailable capacities comprises:

determining a minimum capacity from among respective predetermined capacities of a plurality of disks in the first subset for one of the plurality of intermediate combinations; and determining an excess capacity in relation to the minimum capacity for each of the plurality of disks in the first subset for the one of the plurality of intermediate combinations;

determining an unavailable capacity for the first subset for the one of the plurality of intermediate combinations based on the excess capacity.

15. The computer program product according to claim 12, wherein a number of disks other than the first subset in the first disk set of the target combination is greater than or equal to the first number and smaller than or equal to the predetermined maximum number of disks.

16. The computer program product according to claim 12, wherein a number of disks contained in the second disk set for the target combination is equal to the first number.

17. The computer program product according to claim 12, wherein the set of instructions, when carried out by computerized circuitry, further cause the computerized circuitry to:

in response to the number of the plurality of disks being smaller than or equal to the predetermined maximum number of disks, determine the plurality of disks as disks in the first disk set.

* * * * *